US012166406B2

(12) United States Patent
Uematsu (10) Patent No.: US 12,166,406 B2
(45) Date of Patent: Dec. 10, 2024

(54) ROTARY ELECTRIC MACHINE (71) Applicant: MEIDENSHA CORPORATION, Tokyo (JP)

(72) Inventor: Taku Uematsu, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/697,276

(22) PCT Filed: Aug. 23, 2022

(86) PCT No.: PCT/JP2022/031657
§ 371 (c)(1),
(2) Date: Mar. 29, 2024

(87) PCT Pub. No.: WO2023/053779
PCT Pub. Date: Apr. 6, 2023

(65) Prior Publication Data
US 2024/0339894 A1 Oct. 10, 2024

(30) Foreign Application Priority Data
Sep. 30, 2021 (JP) ................. 2021-160575

(51) Int. Cl.
*H02K 9/19* (2006.01)
*H02K 5/173* (2006.01)
*H02K 5/20* (2006.01)
*H02K 7/08* (2006.01)

(52) U.S. Cl.
CPC ............. *H02K 9/19* (2013.01); *H02K 5/1732* (2013.01); *H02K 5/203* (2021.01); *H02K 7/083* (2013.01)

(58) Field of Classification Search
CPC ........ H02K 9/19; H02K 5/203; H02K 5/1732; H02K 7/083
See application file for complete search history.

(56) References Cited

U.S. PATENT DOCUMENTS

| 5,889,342 A * | 3/1999 | Hasebe ............... H02K 9/19 310/156.19 |
| 10,958,121 B2 | 3/2021 | Miyazono | |
| 2013/0038151 A1* | 2/2013 | Ohashi ............... H02K 7/086 310/59 |
| 2020/0204021 A1 | 6/2020 | Kim et al. | |

FOREIGN PATENT DOCUMENTS

| JP | 2010-124559 A | 6/2010 |
| JP | 2010-220340 A | 9/2010 |
| JP | 2020-014285 A | 1/2020 |

* cited by examiner

*Primary Examiner* — Terrance L Kenerly
(74) *Attorney, Agent, or Firm* — Foley & Lardner LLP (57) ABSTRACT A rotary electric machine includes: a rotor; a shaft that penetrates the rotor along a rotation axis and is pivotally supported by a bearing; a stator accommodating the rotor inside; a rotor cover attached to an axial end surface of the rotor; and a casing having a flow passage for supplying oil to the bearing. The rotor cover has an oil receiving portion that forms a concentric clearance with respect to the shaft and receives the oil from the bearing in the clearance, and an oil distribution passage that communicates with the axial end surface of the rotor from the oil receiving portion. The rotary electric machine supplies the oil guided to the clearance to the oil distribution passage by centrifugal force to cool the rotor.

4 Claims, 8 Drawing Sheets

ROTARY ELECTRIC MACHINE

TECHNICAL FIELD

The present invention relates to a rotary electric machine.

BACKGROUND ART

An event (high-temperature demagnetization) in which a magnetic flux decreases at a high temperature is likely to occur in a magnet accommodated in a rotor of a rotary electric machine. Such high-temperature demagnetization can also be suppressed by applying, for example, a magnet having a high content ratio of heavy rare earths, but this case leads to an increase in manufacturing cost of the rotary electric machine. In general, the rotor is air-cooled by heat dissipation to the air, but there is a demand for more efficient cooling of the rotor from the viewpoint of improving the performance of the rotary electric machine.

For example, there is known a cooling structure in which a refrigerant such as oil flows in a rotor of a rotary electric machine in order to achieve cooling of the rotor and the like. As an example of this type of cooling structure, Patent Literature 1 proposes a configuration in which an oil supply passage is formed inside a rotor shaft along the axial direction, and cooling oil from the rotor shaft is supplied to a radially outer side of a rotor by centrifugal force.

CITATION LIST

Patent Literature

Patent Literature 1: JP 2010-220340 A

SUMMARY OF INVENTION

Technical Problem

However, in the cooling structure in which oil is supplied from the inside of the rotor shaft to the rotor as in Patent Literature 1, it is necessary to sufficiently increase the pressure of the cooling oil with a pump in order to deliver the oil into the shaft, and it is also necessary to provide an oil seal at a portion for delivering the oil to the rotating shaft. Therefore, a cost of the cooling structure increases. Further, the rigidity of the rotor shaft may also decrease because the rotor shaft has a hollow structure in Patent Literature 1.

The present invention has been made in view of the above circumstances, and provides a rotary electric machine capable of cooling a rotor by oil without forming a flow passage of the oil in a rotor shaft.

Solution to Problem

A rotary electric machine of one aspect of the present invention includes: a rotor; a shaft that penetrates the rotor along a rotation axis and is pivotally supported by a bearing; a stator accommodating the rotor inside; a rotor cover attached to an axial end surface of the rotor; and a casing having a flow passage for supplying oil to the bearing. The rotor cover has an oil receiving portion that forms a concentric clearance with respect to the shaft and receives the oil from the bearing in the clearance, and an oil distribution passage that communicates with the axial end surface of the rotor from the oil receiving portion. The rotary electric machine supplies the oil guided to the clearance to the oil distribution passage by centrifugal force to cool the rotor.

In the rotary electric machine of one aspect described above, the rotor may have a void portion penetrating the rotor in the axial direction, and the oil distribution passage may be connected to the void portion. Then, the rotor may be cooled by causing the oil to flow from the oil distribution passage to the void portion.

Further, the void portion may face a magnet arranged in the rotor, and the oil flowing through the void portion may come into contact with the magnet.

In the rotary electric machine of one aspect described above, the shaft may have a delivery portion that protrudes in the radial direction inside the clearance and delivers the oil to the oil receiving portion.

In the rotary electric machine of one aspect described above, the casing may further include: an oil spreading portion that spreads the oil from an upper side of the coil; and an oil supply passage for supplying the oil to the oil spreading portion. Further, the flow passage may supply the oil branching from the oil supply passage.

Advantageous Effects of Invention

According to one aspect of the present invention, the rotor can be cooled by the oil without forming the flow passage of the oil in the rotor shaft.

DESCRIPTION OF EMBODIMENTS

Hereinafter, an embodiment of the present invention will be described with reference to the drawings.

In the embodiment, structures and elements other than the main part of the present invention will be described in a simplified or omitted manner in order for easy understanding. Further, the same elements are denoted by the same reference signs in the drawings. Note that shapes, dimensions, and the like of the respective elements illustrated in the drawings are schematically illustrated, and do not indicate actual shapes, dimensions, and the like.

In the drawings, an XYZ coordinate system is illustrated appropriately as a three-dimensional orthogonal coordinate system. In the XYZ coordinate system, a Z direction is a direction parallel to a rotation axis. An X direction is a direction orthogonal to the Z direction and corresponds to a direction perpendicular to the paper surface of FIG. 2. A Y direction is a direction orthogonal to both the X direction and the Z direction, and corresponds to the vertical direction in FIG. 2. Further, the rotation axis of the rotary electric machine is denoted by reference sign AX as necessary in the drawings. Note that, in the following description, the circumferential direction around the rotation axis AX is simply referred to as the circumferential direction, and the radial direction around the rotation axis AX is simply referred to as the radial direction.

Figure 1:
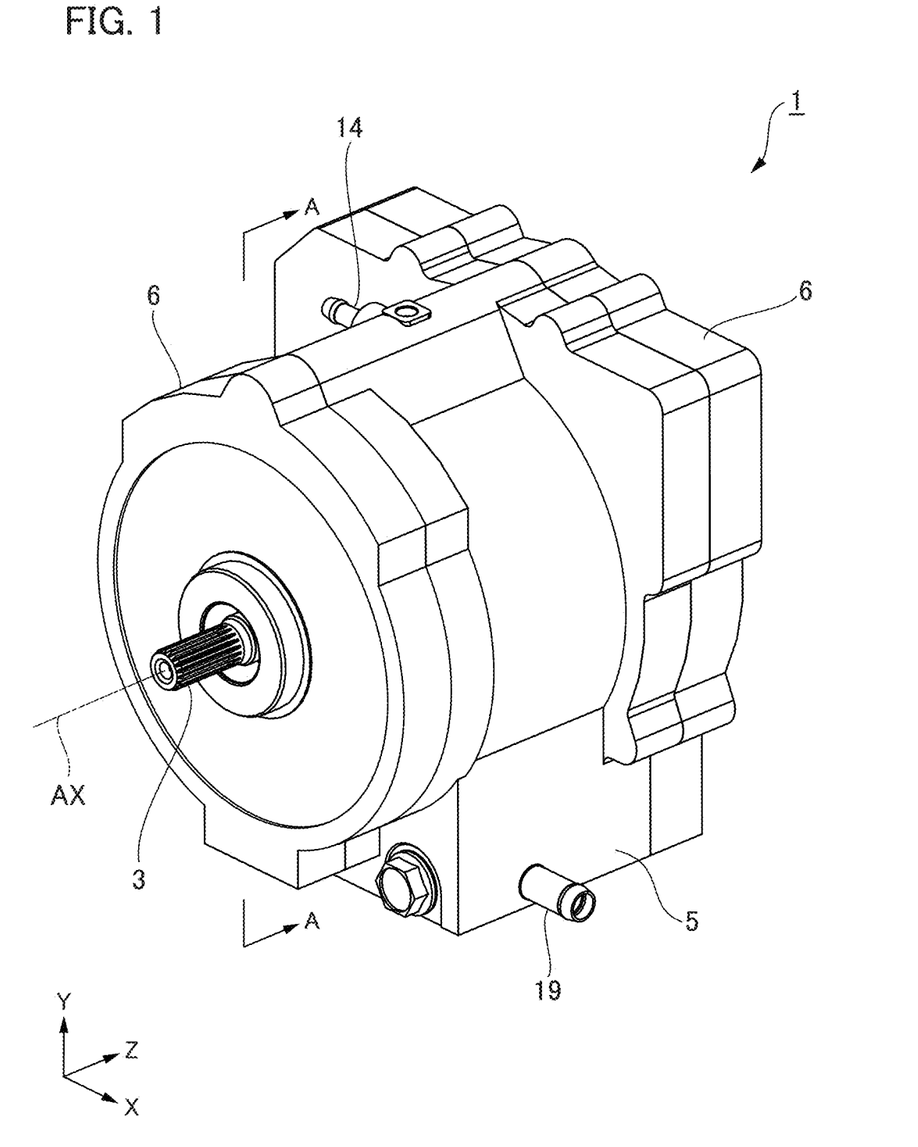
FIG. 1 is a perspective view illustrating an example of a rotary electric machine of the present embodiment.
Figure 2:
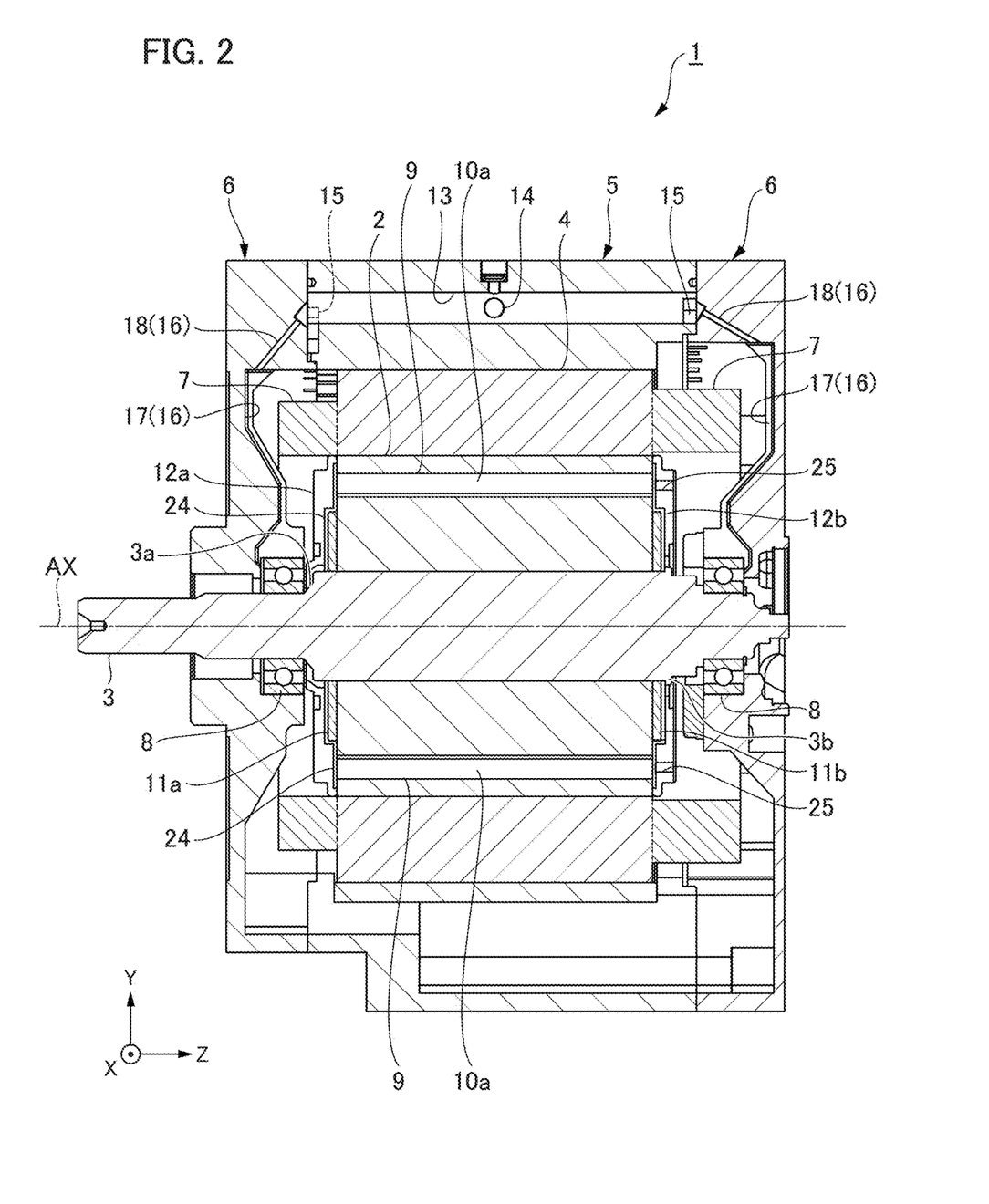
FIG. 2 is a cross-sectional view taken along line A-A of FIG. 1.
Figure 3:
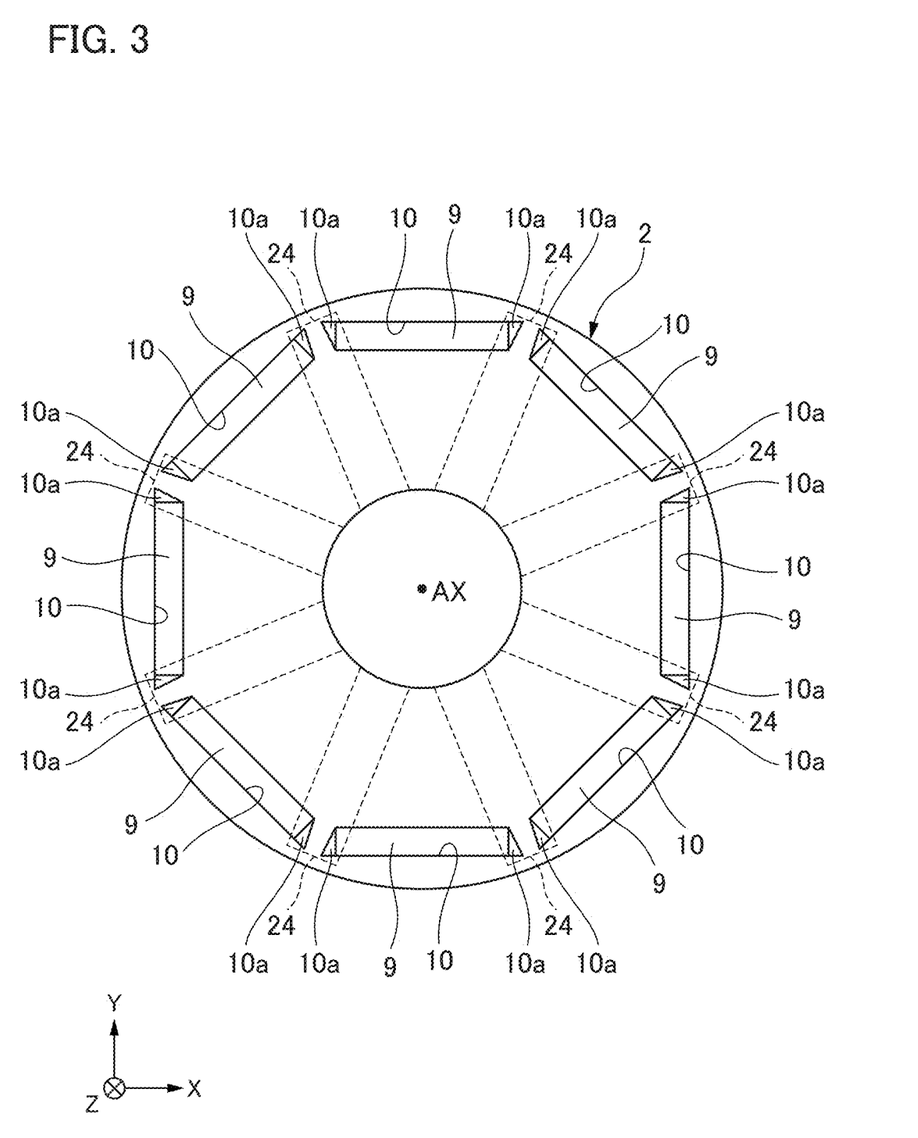
FIG. 3 is a front view illustrating an axial end surface of a rotor.
Figure 4:
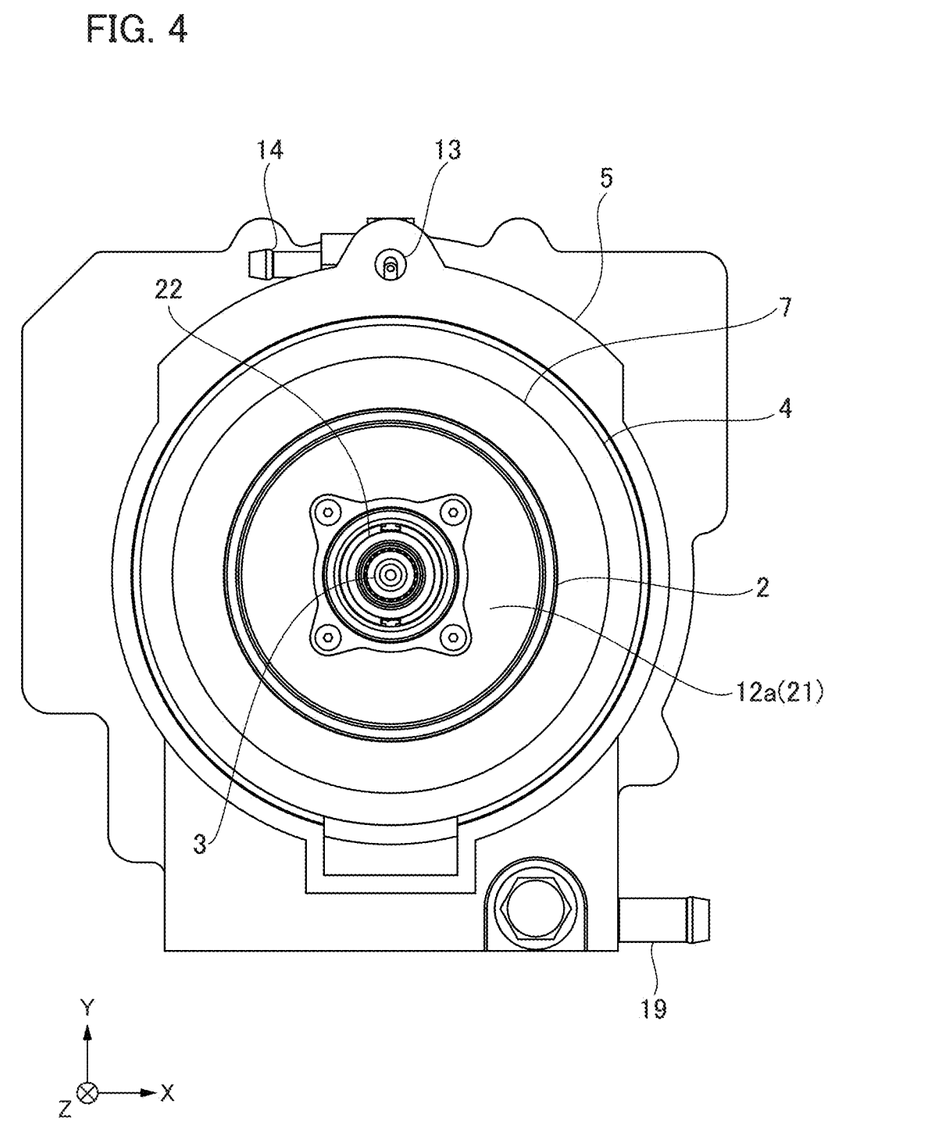
FIG. 4 is a front view of the rotary electric machine in a state where a housing cover on a load side is removed.
Figure 5:
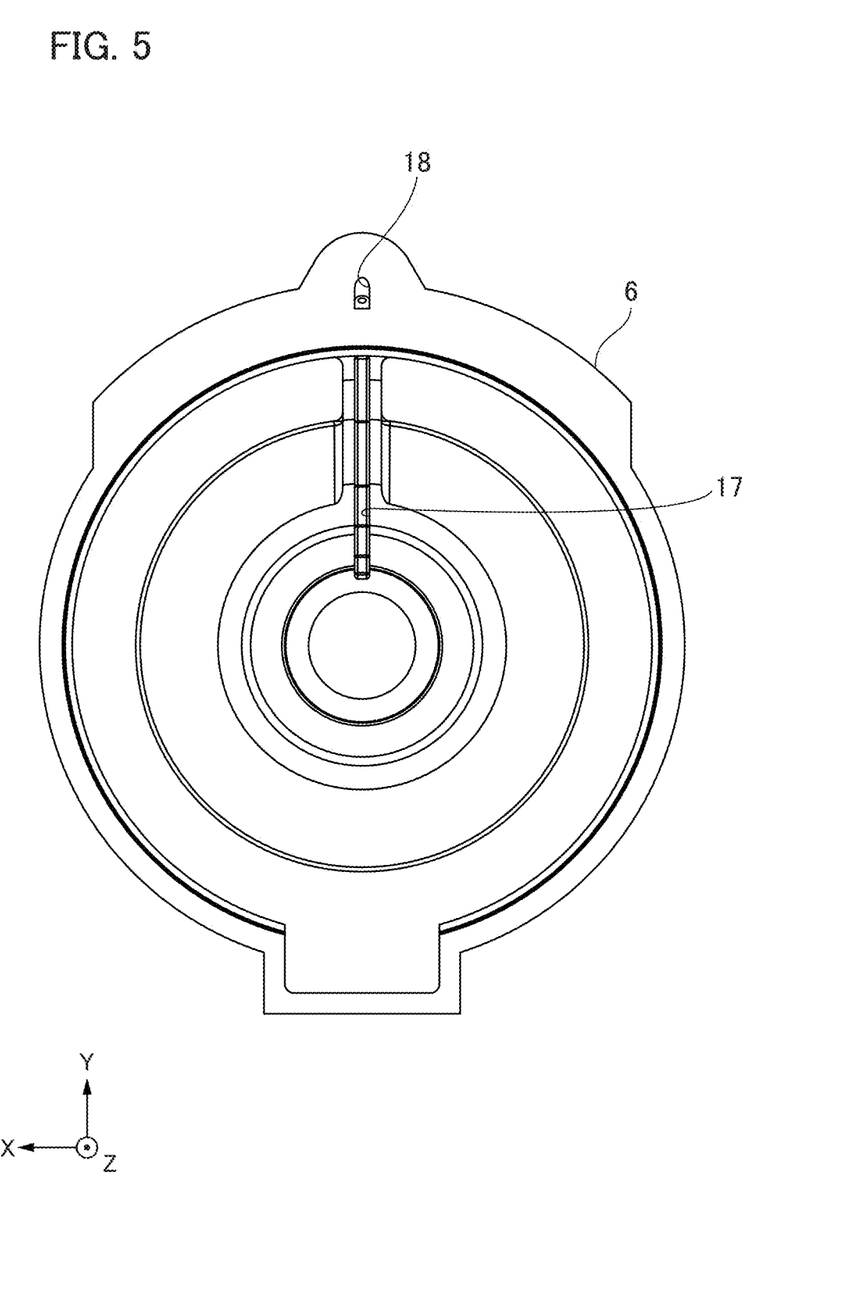
FIG. 5 is a view illustrating an inner surface side of the housing cover on the load side.

FIG. 1 is a perspective view illustrating an example of a rotary electric machine 1 of the present embodiment. FIG. 2 is a cross-sectional view taken along line A-A in FIG. 1. FIG. 3 is a front view illustrating an axial end surface of a rotor. FIG. 4 is a front view of the rotary electric machine 1 in a state where a housing cover 6 on a load side is removed. FIG. 5 is a view illustrating an inner surface side of the housing cover 6 on the load side. Note that the arrangement of oil distribution passages 24 to be described later is indicated by broken lines in FIG. 3.

The rotary electric machine 1 of the present embodiment is an inner rotor type motor, and includes a rotor 2, a shaft 3, and a stator 4. The rotor 2, the shaft 3, and the stator 4 are accommodated in a casing including a housing body 5 and housing covers 6. Note that the housing body 5 and the housing covers 6 are all manufactured by casting.

The rotor 2 is, for example, an interior permanent magnet rotor or a surface permanent magnet rotor. A core of the rotor 2 is formed by laminating a plurality of electromagnetic steel sheets or the like in the axial direction. The shaft 3 is fitted into the center of the rotor 2 so as to penetrate the core along the rotation axis AX. Further, as illustrated in FIG. 2, end plates 11a and 11b and rotor covers 12a and 12b are attached to both axial ends of the rotor 2, respectively.

As illustrated in FIG. 3, a plurality of permanent magnets 9 are arranged in the core of the rotor 2 such that main magnetic poles are formed at equal intervals along the circumferential direction. The permanent magnets 9 are arranged such that main magnetic poles adjacent to each other in the circumferential direction in the rotor 2 have opposite polarities.

The permanent magnet 9 is formed in a rectangular block shape whose axial dimension is substantially the same as an axial dimension of the core, and is fitted into a magnet slot 10 of the core. Further, in the core of the rotor 2, void portions 10a functioning as flux barriers are formed at circumferential ends of the permanent magnet 9, respectively, and the void portions 10a face the permanent magnet 9. Note that the magnet slots 10 and the void portions 10a extend along the axial direction through the core.

As illustrated in FIG. 2, the shaft 3 has a flange portion 3b at a portion exposed to an anti-load side (right side in FIG. 2) from the core of the rotor 2. Further, the shaft 3 has a tapered region 3a at a portion exposed from the core of the rotor 2 to a load side (left side in FIG. 2).

The flange portion 3b of the shaft 3 protrudes annularly in the radial direction of the shaft 3 and abuts on the end plate 11b on the anti-load side. Further, the tapered region 3a of the shaft 3 has a tapered shape reduced in diameter as a distance from the rotor 2 increases and tapered to the load side. The tapered region 3a is an example of a delivery portion.

The end plates 11a and 11b are ring-shaped members each having a hole opened at the center to allow the shaft 3 to be inserted therethrough and having a smaller diameter than the rotor 2. The end plate 11a arranged on the load side (left side in FIG. 2) is in close contact with an axial end surface (first end surface) of the rotor 2 on the load side. Further, the end plate 11b arranged on the anti-load side is interposed between the flange portion 3b of the shaft 3 and the rotor 2, and is in close contact with an axial end surface (second end surface) of the rotor 2 on the anti-load side. The end plates 11a and 11b have a function of pressing the rotor 2 from both sides in the axial direction and holding the core of the rotor 2 made of the laminated steel sheet.

The rotor cover 12a arranged on the load side covers the end plate 11a and the first end surface of the rotor 2 from the outside, and is fixed to the rotor 2 in close contact with the first end surface. The rotor cover 12b arranged on the anti-load side covers the end plate 11b and the second end surface of the rotor 2 from the outside, and is fixed to the rotor 2 in close contact with the second end surface. Note that the configuration of the rotor covers 12a and 12b will be described later.

The stator 4 has a cylindrical stator core and accommodates the rotor 2 inside with a slight air gap. A plurality of slots (not illustrated) are formed along the axial direction on an inner periphery of the stator 4, and a coil is wound around the slots. A coil end portion 7 of the coil overhangs from the stator 4 at both axial ends of the stator 4, and has an annular shape in the circumferential direction.

In the rotary electric machine 1, an attractive force or a repulsive force with respect to a magnetic field of the rotor 2 is generated by sequentially switching the magnetic field of the stator 4 by current control of the coil. As a result, the rotor 2 and the shaft 3 rotate, whereby the rotary electric machine 1 is driven. At this time, the coil generates heat by energization. Further, the permanent magnets 9 accommodated in the rotor 2 are also heated by electromagnetic induction.

The housing body 5 of the rotary electric machine 1 is a casing that has a cylindrical space which is opened on both sides in the axial direction. The rotor 2 into which the shaft 3 is fitted and the stator 4 are concentrically arranged in the cylindrical space of the housing body 5. The stator 4 is fitted to an inner periphery of the housing body 5, and the housing body 5 is attached so as to cover an outer peripheral surface of the stator 4.

The housing covers 6 are respectively attached to the housing body 5 on both the sides in the axial direction. As a result, openings on both the sides of the housing body 5 are closed by the housing covers 6, respectively. Further, each of the housing covers 6 is provided with a bearing 8, and the shaft 3 is axially supported by the bearings 8 of the housing covers 6 in a rotatable manner. Note that an end of the shaft 3 on the load side penetrates the housing cover 6 and protrudes outward.

Further, the housing body 5 has an oil supply passage 13 for oil cooling of the coil end portion 7. The oil supply passage 13 is an oil passage through which cooling oil flows via an oil cooler and an oil pump (both not illustrated), and is connected to an oil inlet 14 through which the cooling oil is received. The oil supply passage 13 is arranged on the upper side of the stator 4 in FIG. 2. The oil supply passage 13 extends in the axial direction in the housing body 5, and both sides thereof are closed by the housing cover 6. Further, ends of the oil supply passage 13 are connected to first flow passages 15 and second flow passages 16, respectively. Note that the first flow passages 15 and the second flow passages 16 are formed on the load side and the anti-load side of the rotary electric machine 1, respectively, and the both have substantially the same configuration.

The first flow passage 15 is a flow passage branching from the oil supply passage 13 and extending in the circumferential direction, and a plurality of holes are opened downward in the flow passage. Each of the holes of the first flow passage 15 communicates with an internal space of the housing body 5 at a position facing an outer peripheral surface of the coil end portion 7. The first flow passage 15 is an example of an oil spreading portion, and has a function of spreading the cooling oil from the oil supply passage 13 to the coil end portion from the upper side.

The second flow passage 16 is a flow passage for supplying the oil to the bearing 8 via the housing cover 6. The second flow passage 16 includes a groove portion 17 formed in the housing cover 6 and a communication hole 18 connecting the oil supply passage 13 and the groove portion 17.

The groove portion 17 of the second flow passage 16 is formed on an inner surface side of the housing cover 6, and extends vertically along the radial direction of the rotary electric machine 1 from the oil supply passage 13 to the bearing 8 as illustrated in FIGS. 2 and 4. Although the groove portion 17 of the housing cover 6 on the load side is illustrated in FIG. 4, the groove portion 17 of the housing cover 6 on the anti-load side is also configured similarly to that on the load side.

The communication hole 18 of the second flow passage 16 is formed to be inclined downward with respect to the axial direction from the end of the oil supply passage 13 in the housing cover 6, and communicates with an upper end of the groove portion 17. As a result, part of the cooling oil from the oil supply passage 13 is supplied to the bearing 8 via the communication hole 18 and the groove portion 17 of the second flow passage 16.

Further, the vicinity of a bottom surface of the housing body 5 functions as an oil pan in which the oil subjected to heat exchange with the coil end portion 7 is stored. The housing body 5 is provided with an oil outlet 19 from which the oil stored in the oil pan is sucked out. The oil outlet 19 of the housing body 5 is connected to the oil pump.

Further, the rotary electric machine 1 of the present embodiment has a function of guiding the oil supplied to the bearing 8 from the rotor cover 12a to the axial end surface of the rotor 2 to cool the rotor 2 and the permanent magnet 9. Hereinafter, the cooling of the rotor 2 in the present embodiment will be described.

Figure 6:
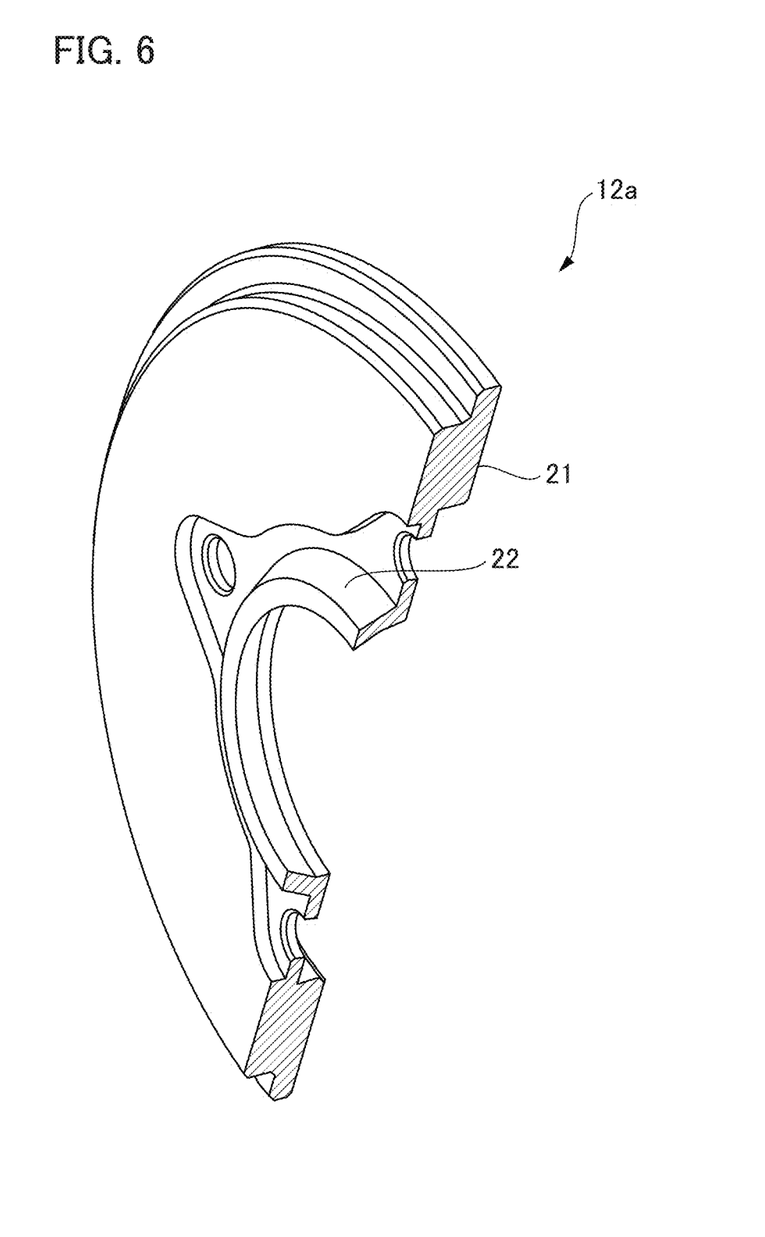
FIG. 6 is a perspective cutaway view of a rotor cover on the load side.
Figure 7:
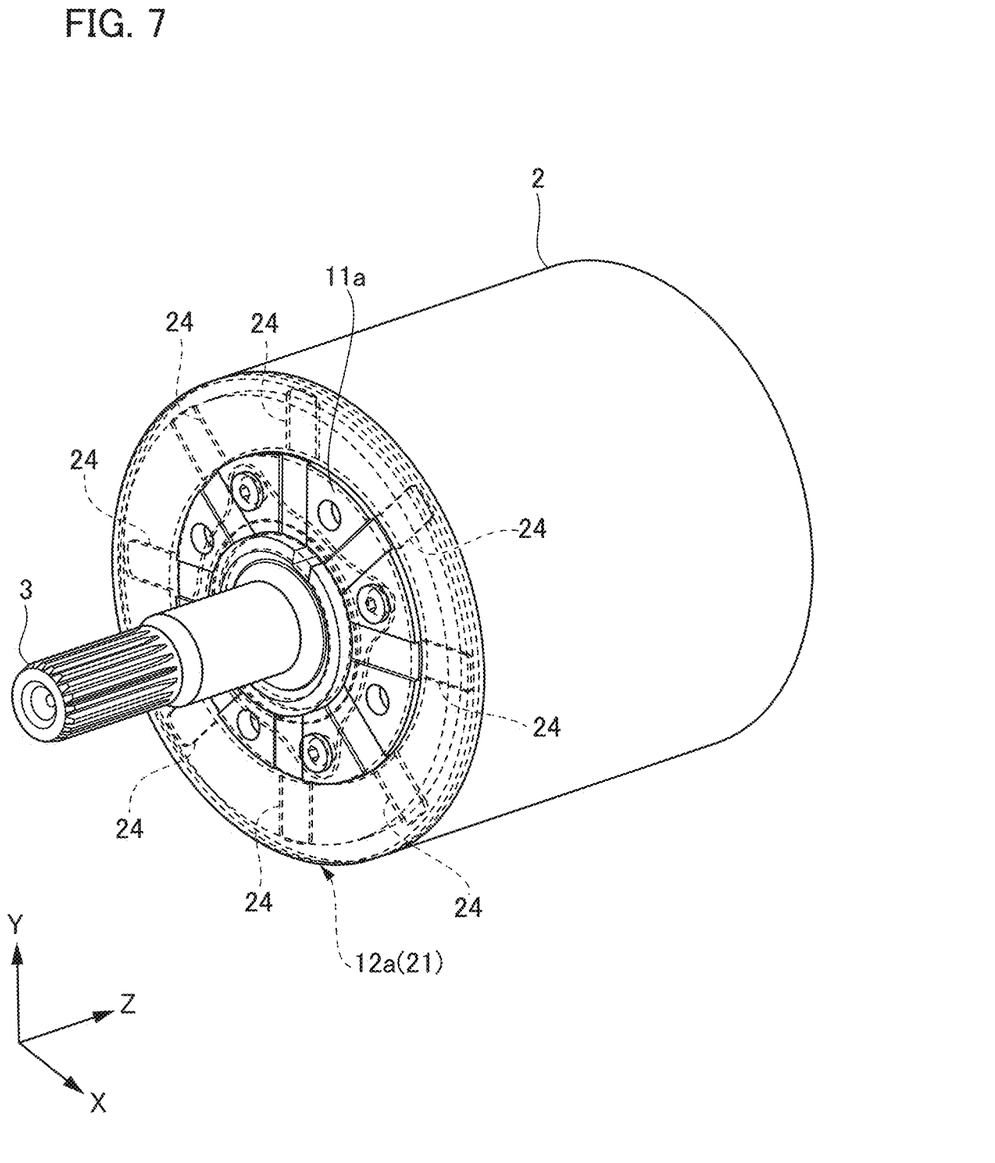
FIG. 7 is a perspective view of the rotor from the load side.
Figure 8:
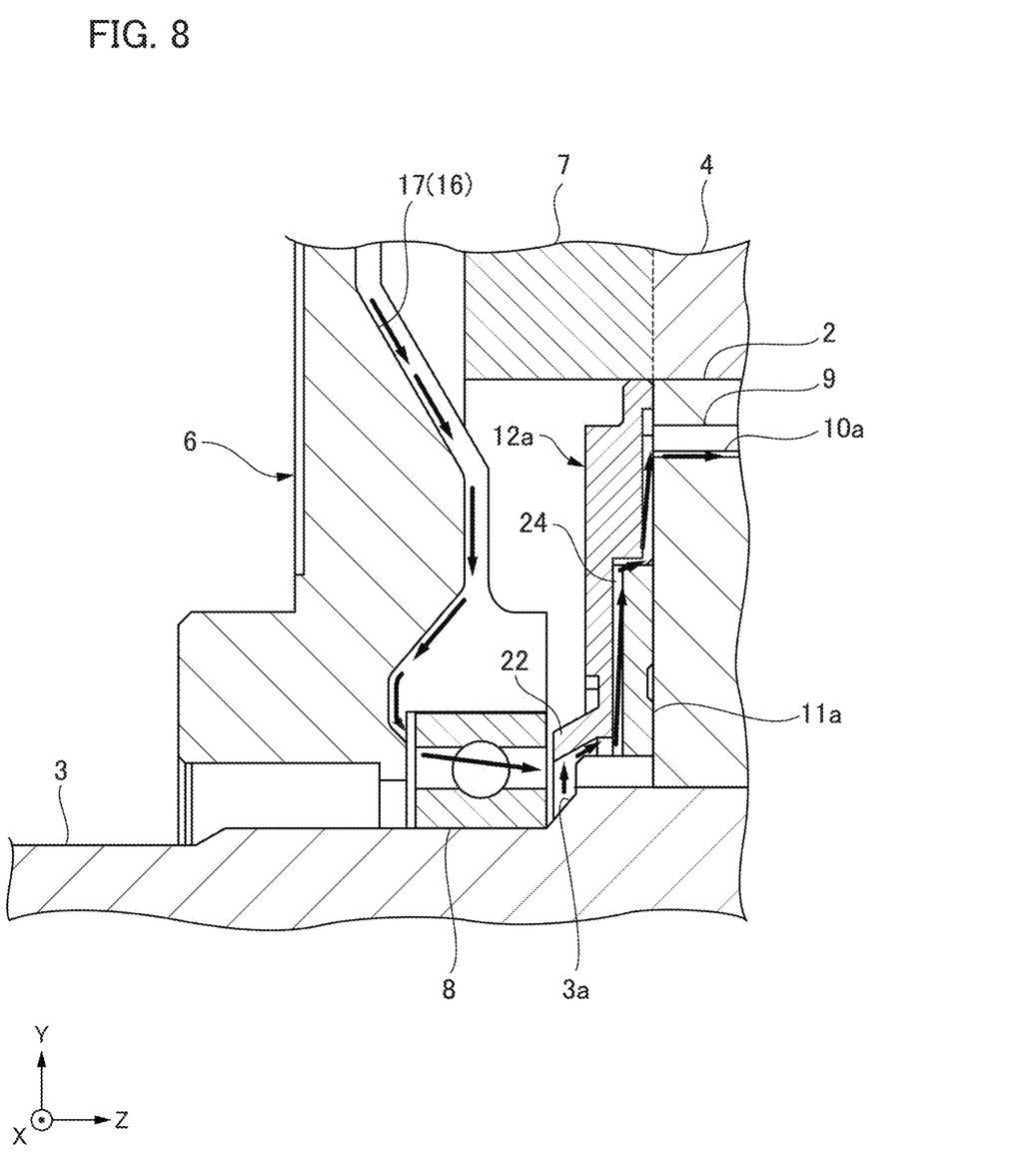
FIG. 8 is an enlarged view of the vicinity of a bearing on the load side in FIG. 2.

FIG. 6 is a perspective cutaway view of the rotor cover 12a on the load side. FIG. 7 is a perspective view of the rotor 2 from the load side. FIG. 8 an enlarged view of the vicinity of the bearing on the load side in FIG. 2. Note that the rotor cover 12a is indicated by broken lines in FIG. 7 to illustrate the arrangement of the oil distribution passages 24 to be described later.

The rotor cover 12a is a disk-shaped member made of metal, and includes a cover body 21, an oil receiving portion 22, and the oil distribution passage 24. The cover body 21 of the rotor cover 12a has an opening portion through which the shaft 3 can be inserted at the center, and has a disk shape having a dimension corresponding to an outer diameter of the rotor 2. A front surface of the cover body 21 faces an inner surface of the housing cover 6, and a back surface of the cover body 21 faces the end plate 11a and the axial end surface of the rotor 2. The cover body 21 covers the axial end surface of the rotor 2, thereby functioning to prevent the permanent magnet 9 from falling off from the rotor 2.

The oil receiving portion 22 is formed in an annular shape on at outer edge on an inner peripheral side of the cover body 21, and has a function of receiving the oil from the bearing 8 in a clearance formed with respect to an outer peripheral surface of the shaft 3. The oil receiving portion 22 protrudes from the front surface of the cover body 21 in the axial direction of the rotary electric machine 1, and has a tapered shape in which an inner peripheral surface increases in diameter from the front surface side toward the back surface side of the rotor cover 12a.

As illustrated in FIGS. 2 and 8, the oil receiving portion 22 of the rotor cover 12a is arranged at a position corresponding to the tapered region 3a of the shaft 3. Further, the oil receiving portion 22 is arranged concentrically with the tapered region 3a of the shaft 3 and covers the tapered region 3a from the outside.

An inner diameter of the oil receiving portion 22 is set to be larger than an outer diameter of the shaft 3, and the concentric clearance is formed around the shaft 3 with respect to the oil receiving portion 22. Further, the rotor cover 12a is attached to the rotor 2 such that a distal end of the oil receiving portion 22 opposes the bearing 8 in the axial direction.

The oil distribution passage 24 is formed on the back surface side of the rotor cover 12a, and has a function of guiding the oil from the bearing 8 received by the oil receiving portion 22 to a radially outer peripheral side of the rotor 2. A plurality of the oil distribution passages 24 extending from the oil receiving portion 22 in the radial direction of the rotor cover 12a are formed in a radial shape around the oil receiving portion 22 in the rotor cover 12a. For example, as illustrated in FIGS. 3 and 7, eight oil distribution passages 24 are formed at intervals of 45 degrees in the circumferential direction. Note that grooves may also be formed on a surface of the end plate 11a in accordance with the positions of the oil distribution passages 24 as illustrated in FIG. 7.

Each of the oil distribution passages 24 has a stepped shape communicating with the axial end surface of the rotor 2 after passing through the surface and a peripheral surface of the end plate 11a in a cross section along the axial direction (FIGS. 2 and 8). Further, as indicated by broken lines in FIG. 3, each of the oil distribution passages 24 is arranged (at a q-axis of d-q-axis coordinates) between magnetic poles of the rotor 2, and a width of the oil distribution passage 24 is a dimension overlapping positions of the two void portions 10a opposing each other in the circumferential direction. Therefore, the oil distribution passage 24 is connected to the void portions 10a, and the oil flowing through the oil distribution passage 24 is guided from the oil distribution passage 24 to the void portions 10a.

Here, the rotor cover 12b on the anti-load side is a disk-shaped member made of metal similarly to the rotor cover 12a on the load side, but is different in configuration from the rotor cover 12a in terms of not including the oil receiving portion 22. Further, as illustrated in FIG. 2, the rotor cover 12b on the anti-load side has a discharge port 25 for discharging the oil guided to the void portion 10a from the rotor 2. The discharge port 25 is arranged between the magnetic poles of the rotor 2 at a position corresponding to the void portion 10a, and is formed to penetrate the rotor cover 12b.

Hereinafter, a flow of oil in the rotary electric machine 1 of the present embodiment will be described.

In the rotary electric machine 1, the oil stored in the oil pan of the housing body 5 is sucked out from the oil outlet 19 by driving of the oil pump and cooled by the oil cooler. The oil cooled by the oil cooler is delivered from the oil inlet 14 to the oil supply passage 13 located on the upper side of the housing body 5. In the oil supply passage 13, the oil flows to one side (the anti-load side) and other side (load side) in the axial direction. In the following description, oil flowing toward the load side of the oil supply passage 13 will be described, and redundant description of oil flowing toward the anti-load side will be omitted.

The oil flowing to the load side of the oil supply passage 13 branches into the first flow passage 15 and the second flow passage 16 at the end of the oil supply passage 13. The oil flowing into the first flow passage 15 is spread to the coil end portion 7 from the upper side, and flows toward the lower side on an outer periphery of the coil end portion 7 from both sides in the counterclockwise direction and the clockwise direction. At this time, the oil in contact with the coil end portion 7 takes heat, whereby the coil end portion 7 is cooled.

On the other hand, the oil flowing into the second flow passage 16 is guided to the bearing 8 through the communication hole 18 and the groove portion 17 as indicated by arrows in FIG. 8. Then, the oil passing through the second flow passage 16 is supplied from between the housing cover 6 and the bearing 8 to the bearing 8, and lubrication of the bearing 8 is secured.

Further, on the load side of the rotary electric machine 1, the oil supplied to the bearing 8 from between the housing cover 6 and the bearing 8 passes through, for example, the inside of the bearing 8 and reaches the rotor 2 side as indicated by arrows in FIG. 8. Thereafter, the oil flows along the shaft 3 into a clearance formed between the shaft 3 and the oil receiving portion 22 of the rotor cover 12a. Here, since the rotor 2 and the shaft 3 rotate when the rotary electric machine 1 is driven, centrifugal force acts on the oil flowing into the clearance between the shaft 3 and the oil receiving portion 22. Further, the oil flowing into the clearance between the shaft 3 and the oil receiving portion 22 is scraped out and delivered radially outward by the tapered region 3a of the shaft 3 protruding in the radial direction.

Then, as indicated by arrows in FIG. 8, the oil flows from the oil receiving portion 22 into the oil distribution passage 24 and is guided radially outward by the centrifugal force. Then, the oil flows into the void portion 10a from the oil distribution passage 24, passes through the void portion 10a penetrating the rotor 2 in the axial direction, and reaches from the load side to the anti-load side of the rotor 2. Thereafter, the oil is discharged from the rotor 2 through the discharge port 25 of the rotor cover 12b.

As described above, by causing the oil to flow through the oil distribution passage 24 of the rotor cover 12b and the void portion 10a of the rotor 2, the permanent magnet 9 fitted in the magnet slot 10 and the core of the rotor 2 come into contact with the oil and undergo heat exchange to be cooled. In particular, a central portion of each of the permanent magnet 9 and the rotor 2 in the axial direction is likely to be filled with heat and is likely to have a high temperature, but temperature unevenness in the axial direction of each of the permanent magnet 9 and the rotor 2 is less likely to occur since the oil flows along the axial direction of the rotor according to the present embodiment.

Further, in the present embodiment, the oil is delivered to each of the oil distribution passages 24 by the centrifugal force due to the rotation of the rotor 2 and the shaft 3, and thus, the oil is substantially evenly distributed to each of the oil distribution passages 24. Therefore, temperature unevenness is less likely to occur between the oil distribution passages 24 in the circumferential direction.

Note that both the oil spread to the coil end portion 7 from the upper side and the oil discharged from the discharge port 25 of the rotor cover 12b flow back to the oil pan and are stored therein. Then, the oil in the oil pan is delivered again toward the oil cooler by driving of the oil pump.

As described above, the rotor cover 12a having the oil receiving portion 22 and the oil distribution passage 24 is attached to the rotor 2 in the rotary electric machine 1 of the present embodiment. The oil receiving portion 22 forms the concentric clearance with respect to the shaft 3 and receives oil from the bearing 8 through the clearance. The oil guided to the clearance is supplied to the oil distribution passage 24 and the void portion 10a by the centrifugal force to cool the rotor 2. Since the rotor 2 is cooled by the oil, for example, even if a magnet having a low content ratio of heavy rare earths is applied to the rotor, it is possible to suppress performance deterioration due to high-temperature demagnetization, which can also contribute to suppression of a manufacturing cost of the rotary electric machine 1.

Note that it is not necessary to provide an oil flow passage in the shaft in the configuration of the present embodiment, and thus, a cost of a cooling structure can be suppressed, and a decrease in rigidity of the shaft is not caused.

The present invention is not limited to the above-described embodiment, and various improvements and design modifications may be made within the scope not departing from the gist of the present invention.

Although the configuration example of the motor has been described as an example of the rotary electric machine 1 in the above-described embodiment, the rotary electric machine of the present invention can also be applied to an oil-cooled generator.

Further, the configuration example in which the tapered region 3a is formed in the shaft 3 as the delivery portion to oppose the oil receiving portion 22 of the rotor cover 12a has been described in the above-described embodiment, but the configuration of the delivery portion is not limited to the above. For example, one or more protrusions may be formed in the circumferential direction of the shaft 3, and the oil from the bearing 8 may be scraped up with the protrusions and delivered to the oil receiving portion 22. Further, the oil from the bearing 8 may be moved to the oil receiving portion 22 by the centrifugal force without forming the taper or the protrusion on the shaft 3 side.

Further, the arrangement and shapes of the permanent magnets 9 and the void portions 10a in the rotor 2 of the above-described embodiment are merely examples, and can be appropriately changed. Further, the void portions of the rotor 2 connected to the oil distribution passages 24 of the rotor cover 12a are not necessarily in contact with the permanent magnets 9.

Further, the shape and the like of the oil distribution passages 24 in the rotor cover 12a in the above-described embodiment are merely examples, and may be have another arrangement such as a spiral shape, for example.

Further, the configuration in which the oil distribution passage 24 is formed in the rotor cover 12a and the oil is discharged from the discharge port 25 of the rotor cover 12b has been described in the above-described embodiment. However, for example, rotor covers each having the oil receiving portion 22, the oil distribution passage 24, and the discharge port 25 may be arranged on the load side and the anti-load side of the rotor 2, respectively. In this case, the oil distribution passage 24 and the discharge port 25 of the rotor cover may be arranged with phases shifted from each other between the load side and the anti-load side of the rotor 2 to alternately change flowing directions of the oil.

Further, a cooling structure for injecting oil to an inner periphery of the coil end portion 7 to cool the coil of the stator 4 may be provided in the above-described embodiment. For example, a hole may be opened in the oil receiving portion 22 of the rotor cover 12a along the radial direction to inject the oil toward the coil end portion 7 by the centrifugal force. Further, an orientation of the discharge port 25 of the rotor cover 12b may be adjusted such that the oil is injected to the coil end portion 7.

Further, the embodiment disclosed herein is to be considered as illustrative and not restrictive in all respects. The scope of the present invention is indicated not by the above description but by the claims, and it is intended that meanings equivalent to the claims and all modifications within the scope are included.

REFERENCE SIGNS LIST

1 Rotary electric machine
2 Rotor
3 Shaft
3a Tapered region
4 Stator
Housing body
6 Housing cover
7 Coil end portion
8 Bearing
9 Permanent magnet
Magnet slot
10a Void portion
12a, 12b Rotor cover
13 Oil supply passage
First flow passage
16 Second flow passage
17 Groove portion
18 Communication hole
21 Cover body
22 Oil receiving portion
24 Oil distribution passage
25 Discharge port

The invention claimed is:

1. A rotary electric machine comprising:
a rotor;
a shaft that penetrates the rotor along a rotation axis and is pivotally supported by a bearing;
a stator accommodating the rotor inside;
a rotor cover attached to an axial end surface of the rotor;
a casing having a flow passage for supplying oil to the bearing,
wherein the rotor has a void portion penetrating the rotor in an axial direction,
the rotor cover has
an oil receiving portion that forms a concentric clearance with respect to the shaft and receives the oil from the bearing in the clearance; and
an oil distribution passage that communicates with the axial end surface of the rotor from the oil receiving portion and is connected to the void portion,
the rotor cover supplying the oil guided to the clearance to the oil distribution passage by centrifugal force and flowing the oil to void portion from the oil distribution passage to cool the rotor,
the rotor cover is attached to each of one side and other side of the rotor in the axial direction,
the rotor cover on the one side causes the oil to flow into the void portion of the rotor from the one side to the other side,
the rotor cover on the other side causes the oil to flow into the void portion of the rotor from the other side to the one side, and
the oil distribution passage of the rotor cover on the one side and the oil distribution passage of the rotor cover on the other side are arranged with phases shifted in a circumferential direction of the rotor.

2. The rotary electric machine according to claim 1, wherein
the void portion faces a magnet arranged in the rotor, and
the oil flowing through the void portion comes into contact with the magnet.

3. The rotary electric machine according to claim 1, wherein
the shaft includes a delivery portion that protrudes in a radial direction inside the clearance and delivers the oil to the oil receiving portion.

4. The rotary electric machine according to claim 1, wherein
the casing further includes: an oil spreading portion that distributes the oil from an upper side of the coil provided on the stator; and an oil supply passage for supplying the oil to the oil spreading portion, and
the flow passage supplies the oil branching from the oil supply passage.

* * * * *